Jan. 23, 1951 L. W. FRANKLIN 2,539,243

RADIO MODULATION SYSTEM

Filed May 18, 1949

INVENTOR.
L. W. FRANKLIN
BY E. R. Evans
his Attorney

Patented Jan. 23, 1951 2,539,243

UNITED STATES PATENT OFFICE 2,539,243

RADIO MODULATION SYSTEM

Lawrence W. Franklin, Hasbrouck Heights, N. J.

Application May 18, 1949, Serial No. 93,979

9 Claims. (Cl. 332—59)

Figure 1:
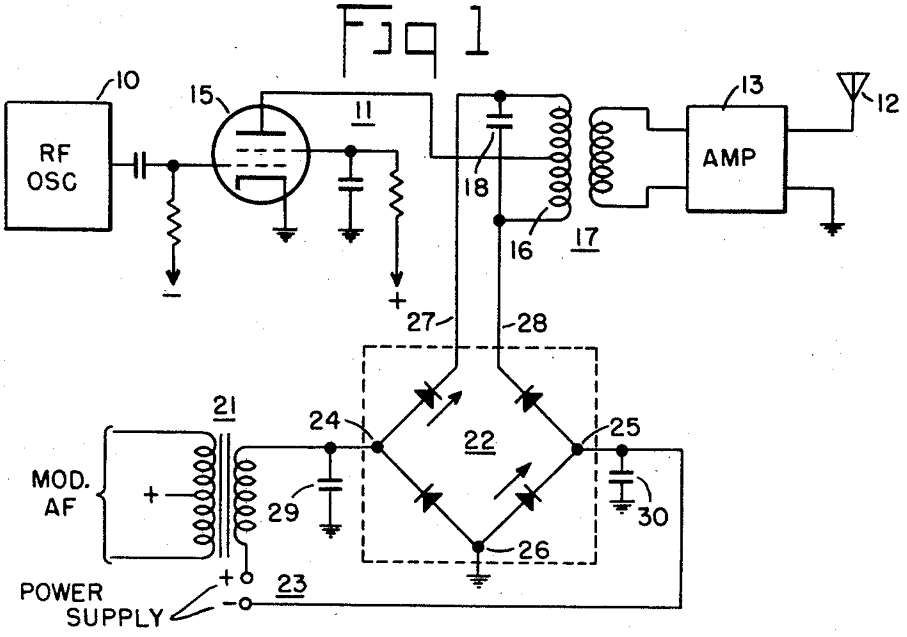

This invention relates to radio transmitting systems, and more particularly to an amplitude-modulation system for radio transmission of the type shown in my prior Patent No. 2,493,484, dated January 3, 1950.

In general terms, the object of the present invention is to enable high average modulation to be employed in radio telephone communication without excessive distortion and so-called sideband "splatter" on adjacent channels. In this manner, the efficiency or effective range of the transmitter is increased.

Another object of the invention is to provide an improved modulator embodying means to prevent carrier cut-off on negative peak overmodulation and simultaneously reverse the phase of the carrier upon the occurrence of such peaks, thereby reducing "splatter" and distortion which normally accompany over-modulation of the carrier.

Still another object of the invention is to simplify modulation systems of the above-noted character and provide an arrangement which may be employed by a simple modification of existing apparatus to improve the efficiency of a transmitter.

A further object of the invention is to improve radio transmission characteristics in a system employing "exalted carrier" reception in which a low-amplitude carrier is employed combined with high-amplitude upper and lower sidebands, distortionless reception being provided by supplying at the receiver sufficient additional carrier for proper demodulation.

Other objects and advantages of the invention will appear from the following detailed description of preferred embodiments thereof. Referring to the drawings, Fig. 1 is a diagrammatic view of a modulation system embodying the invention; and Fig. 2 is a similar view of a modification.

Figure 2:
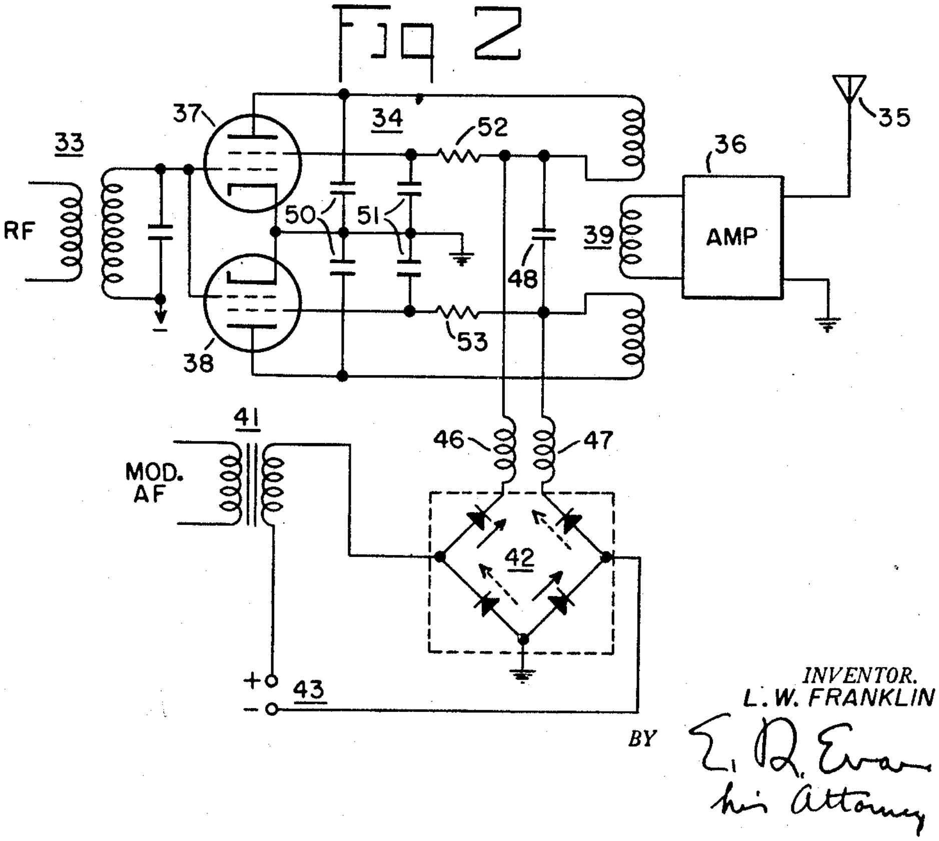

In Fig. 1, a radio transmitting system is shown comprising a source 10 of radio-frequency current connected to the modulating stage 11 and to an antenna 12 through an amplifier 13. The modulating stage 11 is intended to represent any suitable type of amplitude modulator and is shown by way of example as a plate-modulating stage of the usual type except as hereinafter described. It includes a tetrode 15, the plate electrode of which is connected to the midpoint tap on the divided primary winding 16 of the transformer 17 coupling the modulating stage 11 to the amplifier 13. The winding 16 is tuned to the operating frequency by the shunt condenser 18. The end terminals of this tuned circuit are connected respectively to sources of direct-current and modulating-current potential which are operative through one or the other halves of the winding 16, depending upon whether the modulating potential is less or greater than that of the power-supply source, so that the carrier reverses in phase on the occurrence of negative modulation peaks exceeding the amplitude of the carrier.

The voice currents or modulated audio-frequency currents are impressed upon the audio-frequency transformer 21, the secondary winding of which is connected to the modulating stage 11 through the full-wave rectifier 22 in series relation with the class C power supply 23. As shown by way of example, the rectifier 22 may consist of four rectifier elements connected to form a bridge, the opposite terminals 24 and 25 of which are connected to the transformer 21 and power supply (direct-current) source 23. The third terminal 26 is grounded and the opposite arms of the bridge are connected through conductors 27 and 28 to the end terminals of the primary winding 16 of the coupling transformer 17. The R. F. bypass condensers 29 and 30 are connected between the terminals 24 and 25, and ground, to provide a low-impedance path to ground for the carrier frequency.

When the modulation peaks do not exceed the amplitude of the carrier (or the peak voltage of the modulating current source 21 is not greater than that of the power supply 23), the terminal 24 of the rectifier 22 is at a positive potential and current flows as indicated by the arrow through the rectifier unit in conductor 27 and the upper half of winding 16 to the plate of the tube 15. As well understood by those skilled in the art, this modulates the amplitude of the carrier current appearing in the secondary winding of coupling transformer 17 in accordance with the modulated audio-frequency variations impressed upon the A. F. input transformer 21. Under the assumed conditions, the rectifier unit between terminals 25 and 26 is conducting, thereby grounding the negative terminal of the power supply 23.

When the negative modulation peaks exceed the amplitude of the carrier, the rectifier terminal 24 becomes more negative than the terminal 25. During this interval therefore, the terminal 24 is effectively grounded at the terminal 26 whereas the rectifier unit in conductor 28 supplies positive potential to the plate of the tube 15 to maintain the desired conditions in the modulating stage to prevent carrier cut-off. Since in this instance the plate current flows through the lower half of the winding 16 of the coupling transformer 17, the phase of the carrier appearing in the secondary winding will be reversed or shifted 180°. This reversal minimizes the production of harmonics or sideband "splatter" and is found to greatly improve the transmission characteristics. The R. F. bypass condensers 29 and 30 provide a ground return for the R. F. carrier traversing the tube 15 and winding 16 of the transformer 17 during both normal and overmodulation periods.

It will thus be seen that the described system not only prevents carrier cut-off on negative peaks substantially as described in my prior patent but also in a simple manner reverses the phase of the carrier during such peaks which has been found to be highly desirable. The desired result may be accomplished in various ways, utilizing the principles which have been explained above.

One of these modifications, based on the same principles, is shown in Fig. 2. This system also may be embodied very easily in a conventional plate-modulated radio transmitter to obtain increased efficiency from an existing station. As in Fig. 1, by way of example, a carrier source 33 is connected through a modulating stage 34 to antenna 35. An output amplifier 36 is usually employed. The modulating stage 34 comprises parallel-input tubes 37 and 38, the plates of which are connected to divided or separate primary windings of the coupling transformer 39. The A. F. modulating source represented by the transformer 41 is connected through a rectifier 42, corresponding to the rectifier 22 in Fig. 1, to the plates and screens of the modulating tubes 37 and 38 in series relation with the power supply (direct-current) source 43 and the windings of transformer 39. Until 100% modulation is reached, the tube 37 is driving the plate tank circuit, current to the plate and screen of the tube 38 being suppressed by the rectifier 42. On negative modulation peaks in excess of the carrier, however, the rectifier 42 switches the current flow from that shown by the full-line arrows to that shown by the dotted arrows, so that only tube 38 is driving the final tank circuit including transformer 39. It will be apparent that, since the carrier is impressed upon both tubes 37 and 38 in phase but their output currents are applied to the opposite ends of the tank circuit, the R. F. carrier appearing in the secondary of transformer 39 will be reversed in phase during the negative modulation peaks.

The R. F. chokes 46 and 47 may be used in the leads to the rectifier 42 as the rotor of the plate tuning condenser 50 is the R. F. ground point. A bypass condenser 48 for R. F. is connected between the inner terminals of the two primary windings of the transformer 39. The usual screen grid condensers 51 may be employed in connection with the tubes 37 and 38. Limiting resistors 52 and 53 may also be employed in the screen circuits.

It will be apparent that the invention provides a modulation system in which carrier cut-off is prevented and reversal of the carrier phase is effected during negative modulation peaks in a simple and effective manner. Obviously the invention is especially advantageous in "exalted carrier" transmission where the amplitude of the sidebands is high compared to the carrier. Various modifications of the systems shown and described for the purpose of explaining the underlying principles will occur to those skilled in the art and may be made without departing from the scope of the invention.

I claim:

1. A radio transmitting system comprising a carrier source, a modulating stage, a source of modulating current connected to said stage, means to supply positive potential to said modulating stage when the modulation level exceeds 100% of the carrier during negative modulation peaks and means to simultaneously reverse the phase of the carrier during such peaks.

2. A radio transmitting system comprising an amplitude-modulating stage including a modulating electrode, direct-current and modulating-current sources connected to said electrode and rectifying means connected to said sources and said modulating electrode for preventing carrier cut-off on negative modulation peaks exceeding the voltage of said direct-current source and for reversing the phase of the carrier during such negative peaks.

3. A radio transmitting system comprising a source of carrier current, a modulating stage connected thereto, a source of modulating current connected to said modulating stage and rectifier means for reversing the phase of the carrier on negative modulating peaks exceeding the amplitude of the carrier.

4. A radio transmitting system comprising a carrier source, a modulating stage including an output transformer having a divided primary winding and means including a rectifier in circuit with each section of the primary winding to prevent carrier cut-off and effect phase reversal of the carrier on negative modulation peaks.

5. A radio transmitting system comprising a carrier source, two parallel-input modulating tubes connected thereto, said tubes having a common output circuit to which currents of opposite phase are supplied by the respective tubes, and means for switching the modulating plate supply to said tubes from one to the other upon the change from normal level to overmodulation to effect phase reversal of the output carrier on negative overmodulation peaks.

6. A radio transmitting system comprising a carrier source, an output circuit, a modulating stage connected between said source and the output circuit, said modulating stage including a divided-winding transformer to effect phase reversal of the carrier in the output circuit upon alternate energization of said winding, sources of modulating and plate-supply current for said modulating stage and rectifier means between said last-mentioned sources and said transformer to effect phase reversal of the carrier in said output circuit on negative overmodulation peaks.

7. A radio transmitting system comprising a carrier source, an amplitude-modulating stage including electron-discharge tube modulating means and an output circuit connected thereto, a source of modulating current connected to said modulating stage and means for switching the connections of said tube modulating means to effect reversal of the phase of the carrier in said output circuit upon the occurrence of negative overmodulation peaks.

8. A radio transmitting system as defined in claim 7 in which the electron-discharge tube modulating means comprises two tubes, one for supplying normal carrier and the other reversed-phase carrier to said output circuit.

9. A radio transmitting system as defined in claim 7 in which the tube modulating means is connected to the output circuit through a transformer having a divided or double primary winding, each section of which is energized for normal or reversed-phase operation respectively.

LAWRENCE W. FRANKLIN.

REFERENCES CITED

The following references are of record in the file of this patent:

UNITED STATES PATENTS

| Number | Name | Date |
|---|---|---|
| 2,285,896 | Brown | June 9, 1942 |